United States Patent [19]

Eckels

[11] 4,033,324
[45] July 5, 1977

[54] SOLAR HEAT COLLECTOR

[76] Inventor: Robert E. Eckels, 2101 Youngfield St., Golden, Colo. 80401

[22] Filed: Mar. 10, 1975

[21] Appl. No.: 556,807

[52] U.S. Cl. .............................. 126/270; 126/271; 350/167; 350/175 SL

[51] Int. Cl.² ............................................ F24J 3/02

[58] Field of Search ........... 126/270, 271; 237/1 A; 350/167, 175 SL

[56] References Cited

UNITED STATES PATENTS

| 1,074,219 | 9/1913 | Skiff | 126/270 |
| 1,093,498 | 4/1914 | Thring | 126/271 |
| 2,277,311 | 3/1942 | Freeman | 126/271 |
| 3,025,335 | 3/1962 | Ralph | 126/270 |
| 3,587,559 | 6/1971 | Nonaka | 126/271 |
| 3,859,980 | 1/1975 | Crawford | 126/271 |

*Primary Examiner*—Kenneth W. Sprague
*Assistant Examiner*—James C. Yeung

[57] ABSTRACT

A plurality of focusing elements mounted above a solar radiation absorbing substrate, focuses solar energy rays into a series of hot spots on the substrate, providing a high temperature for a heat transfer medium.

6 Claims, 14 Drawing Figures

SOLAR HEAT COLLECTOR

The utilization of solar energy involves, in one type of unit, absorbing the energy of the solar rays on a heat absorber, transferring the absorbed heat to a heat transfer medium [usually a fluid] and then recovering much of the heat from transfer medium in a heat sink or storage area or immediate use. One means for absorbing solar radiation includes a planar surface usually blackened metal, to absorb the heat from the solar rays. Such a surface is preferably placed at right angles to the solar rays for maximum absorption. Some difficulties are readily apparent in maintaining the plane of the surface area normal to solar rays throughout each day including the change of sun angles due to changes where the sun apparently moves north and south in the sky in relation to the ground. The sun, from sunup to sundown, continuously changes its angles to a point, and thus for the dayly optimum impingement of the rays on a planar surface, said surface must be rotated with the sun from morning to night. Also, as the relative north-south position of the sun and the sky changes from season to season, still another movement of the planar surface must be accomplished to maintain the normal position of the surface to the sun's rays at all time.

A mechanism for maintaining a planar surface at right angles [in two directions] to the sun's rays is available, but such a mechanism is expensive and delicate. Astronomical observatories use similar equipment for the movement of the telescope in relation to the stars and planets compensating for the earth's rotation and its seasonal movements. But such mechanism is not economically feasible for residential or commercial heating.

Solar heating for such mundane projects as heating homes and factories and the like simply cannot feasibly be accomplished using expensive equipment which requires more than very occasional maintenance. It has been found, however, that a stationary planar absorbing surface is economically feasible, using a compromise between the angles of the daily movement of the earth in relation to the sun and in the north-south direction from season to season. As such a surface is stationary, the early morning and the late evening rays of the sun are almost wholly reflected from the absorbing surface, even though it is black. The optimum absorption is not achieved in such an arrangement until the noon position of the sun. Even in this position, however, the surface is positioned at an angle, which is a compromise between the larger angle due to the lowest point of the winter sun and to the lowest angle of the summer sun at noon. Thus, only a small amount of the total solar radiation actually reaching the area of the absorber is absorbed.

Solar radiation is reflected from any surface on which it impinges at any angle, even black surfaces. At low angles to the surface area the reflection is substantial. Therefore, any stationary, black absorbing surface will be very inefficient in heat absorption during much of the day, using conventional systems. A conventional system, generally, utilizes a black, absorbing surface covered by a transparent sheet [glass or plastic] as a weather protection, and to form passage for a transfer medium to pick up heat from the absorbing surface. The overlaying transparent surface reflects a substantial amount of the solar energy, particularly at low angles, reducing the amount of solar energy reaching the absorption surface and further reducing the efficiency in the pick up.

According to the present invention, there is provided an improvement in a solar radiation absorber, which provides a plurality of focusing centers mounted on or above an absorbing surface to accumulate the sun's rays from a wide range of angles of incident to the absorbing surface, and increase the absorption of available sun's radiation on the absorption media. This, also, increases the temperature of the absorption media. At all angles to the plane of the absorption substrate, and particularly at low angles, the sun's rays impinge upon the arcuate surfaces and are focused on the substrate. This focusing produces hot spots, which are considerably higher in temperature than direct impingement of the rays on the surface, and also the arcuate surfaces reduce the reflection since a substantial portion of the impingement area is at or near a right angle to the solar radiation even with horizontal absorber surfaces. With the invention, the absorbing surface may be horizontal and still provide an improved solar radiation absorption. As the rate of heat transfer is a direct function of the temperature difference, low angle radiation efficiency is improved by the system of the invention, providing hot spots which increase the temperature of the substrate substantially above direct impingement.

It is therefore, an object and advantage of the present invention to provide an improved solar radiation absorption system.

Another object of the invention is to provide an improved radiation absorption system using a stationary substrate to provide improved absorption efficiency for a greater portion of a day.

Yet another object of the invention is to provide an improved solar radiation absorption system providing a higher temperature on an absorptive substrate.

Still another object of the invention is to provide an improved solar radiation absorption system using a plurality of closely spaced focusing elements for heating an absorption substrate by solar radiation.

A subsequent object of the invention is to provide an improved solar radiation absorption system having a plurality of arcuate focusing elements for producing a plurality of hot spots on an absorption surface from solar radiation.

A further object of the invention is to provide an improved solar radiation absorptive system providing a plurality of transparent spheres transmitting solar radiation as a plurality of hot spots on an absorption substrate.

An additional object of the invention is to provide an improved solar radiation absorption system utilizing a layer of closely spaced microspheres on an absorption surface to increase the temperature of solar radiation transmitted through the spheres to the absorption surface.

These and other objects and advantages of the invention may be readily ascertained by referring to the following description and appended illustrations in which.

Figure 1:
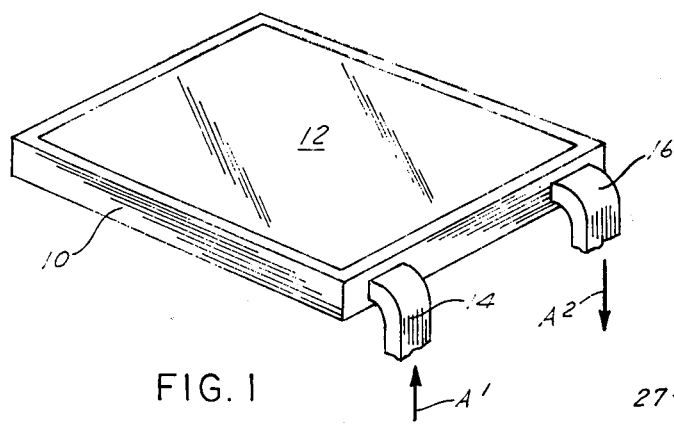
FIG. 1 is a perspective, generally schematic view of one type of absorber unit for solar radiation utilizing a fluid transfer agent.
Figure 2:
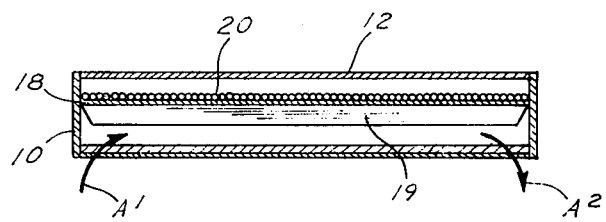
FIG. 2 is a cross-sectional view of a solar radiation absorption unit, utilizing the invention to increase the temperature of an absorptive substrate and using a fluid to transfer heat absorbed to a point of use.

As schematically shown in FIGS. 1 and 2, a housing 10 provides means for a solar absorption system utilizing the focusing elements of the invention. Mounted in the housing 10 is a black substrate 18, which may be an aluminum sheet, or other material, with its upper surface painted black, or using a similar type solar-absorbing surface. In some cases this substrate may be provided with fins 19 extending below the surface providing means for transferring heat absorbed on the solar surface. This heat may be picked up by air passing through the space, wherein an air supply A-1 is introduced into the box through an inlet 14. This air passes under the substrate 18 to an outlet 16 providing heated air A-2. The housing 10, which may be formed of convenient material, is enclosed by means of a top transparent sheet 12 which may be glass, plastic or the like arranged to transmit the solar radiation impinging on its surface to the inside of the housing. The solar radiation passes through the transparent surface onto focusing spheres 20 as explained more fully below. The housing 10 is arranged for placement in a horizontal or an angular position to the horizontal for picking up solar radiation. In conventional homes, the housing 10 would normally be placed on the roof which is at an angle to the horizontal, however, in buildings which utilize flat horizontal roofs, the unit may be placed horizontally on the roof to provide for the absorption of solar radiation impinging upon the surface of the unit. Conveniently, the units are made in modules for connection both endwise and sidewise for building up large area units.

Figure 5:
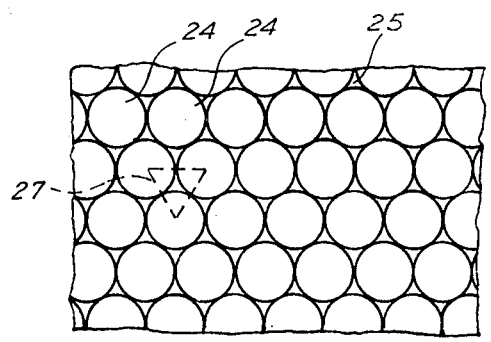
FIG. 5 is a top planned view of a modified focusing system according to the invention.
Figure 3:
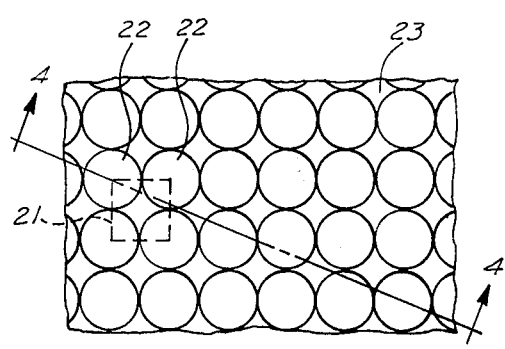
FIG. 3 is a top plan view of one form of a portion of a focusing element according to the invention.
Figure 4:
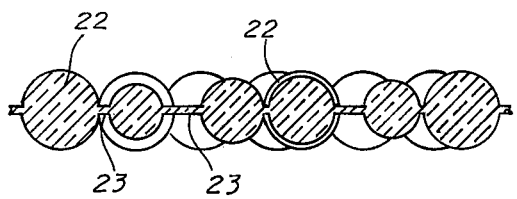
FIG. 4 is a cross-sectional view of the system of FIG. 3 taken along section line 4—4.
Figure 7:
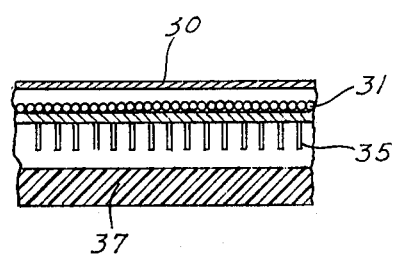
FIG. 7 is a cross-sectional view of the device of FIG. 6 taken along section line 7—7.

In one form of the invention, a plurality of solid spherical members are mounted in side-by-side relation above the substrate 18 so that transmission of the solar radiation through the spheres focuses the radiation into hot spots on the absorptive surface. These hot spots increase the temperature of the absorption media above the temperature of the normal direct impingement without the focusing elements. One type of arrangement for utilizing a plurality of spheres is shown in FIG. 3, wherein a plurality of spheres 22 are mounted in a web 23. The spheres 22 are preferably made of solid plastic or glass and are positioned in the web 23 to provide a sheet-like material of the spheres. The spheres may be of different size generally from ¼-inch in diameter to about 2 inches in diameter for the spheres, and in a preferred form less than about 1 inch in diameter. In the arrangement of FIGS. 3 and 4, the spheres are placed on rectangular coordinates. As shown in FIG. 5, a plurality of spheres 24 mounted in a web 25, in a similar manner, are arranged on triangular coordinates to produce a slightly higher pack per unit of area than the rectangular configuration of FIG. 3. These sheets may be molded or the like.

Figure 6:
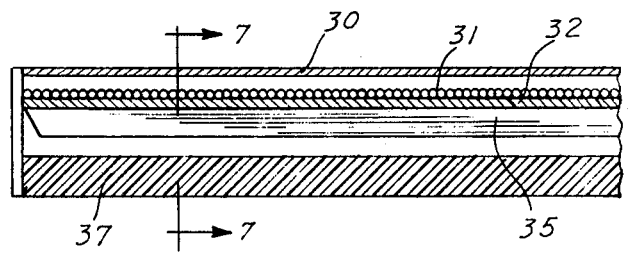
FIG. 6 is a cross-sectional view of a heat absorbing system according to the invention.

The plurality of spheres mounted in a web forming the sheet-like arrangement may be mounted so as to permit the spheres to rest directly upon the absorptive substrate. Such a condition is shown in FIG. 6 wherein a transparent sheet 30 is mounted thereunder a plurality of fins 35 which permits an air space under the absorptive surface above an insulating bottom 37. In this instance, the transmitting air is passed between the substrate 32 and the insulating surface 37. The spheres may be adhered directly onto the absorptive substrate. The spheres may be microspheres (2 to 1000 microns) or larger, as desired. The spheres may be separate or in a sheet. Where the substrate is horizontal little adhesion is necessary for free spheres, and the sheet-like members may be used without adhesion on an angled substrate.

Figures 8, 9:
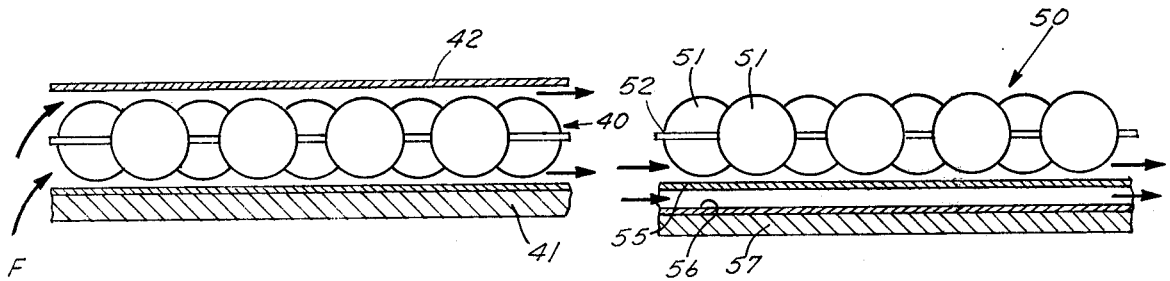
FIG. 8 is a cross-sectional side elevational view of a further modified form of a solar radiation absorber according to the invention.
FIG. 9 is a cross-sectional elevation of a portion of a modified heat absorption arrangement according to the invention.

As shown in FIG. 8, a focusing sheet, shown in general by numeral 40, is mounted so as to be spaced above an absorptive surface 41 and below a transparent sheet 42. In this manner, air or heat transfer fluid F may be passed under the focusing sheet 40 and above the absorptive plate 41 and also above the focusing sheet 40 between it and the transparent surface 42. This arrangement picks up heat which is picked up by the reflecting members by absorption, reflection from the substrate, and other means. A slightly modified form is shown in FIG. 9, wherein the sheet of focusing members mounted in a web forms a sheet and provides an exterior cover for the black surfaces, without the requirement of the transparent overlay. As shown in FIG. 9, a sheet 50 comprising spheres 51 in a web 52 provides an impervious sheet which may be secured around its periphery to a frame, such as that shown in FIG. 1, without the need of the transparent overlay. This sheet is mounted over a black absorbing surface 55 which is spaced from a black surface 56 mounted on insulation 57. In this arrangement, the fluids are passed from the left side around the lower sphere halves and between the two absorbing surfaces to the heated exit side at the right. In this case, the ambient air is on the upper side of the focusing element. The focusing sheet 50 may be kept clean merely by washing with water, which provides a clean surface for the transmission of the rays through the spheres focused onto the black absorbing surfaces.

Figures 10, 11:
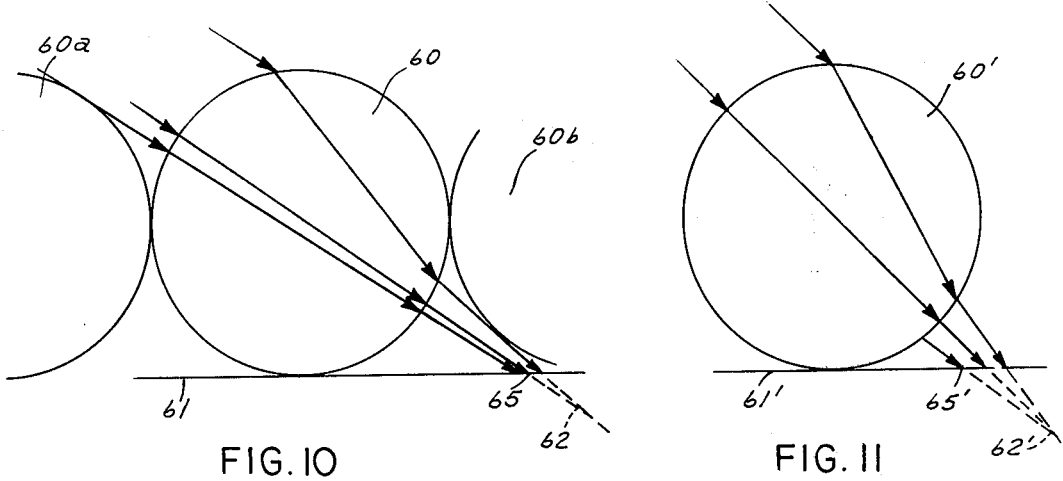
FIG. 10 is an enlarged, schematic view of a focusing sphere, according to the invention, showing the action of the sun's rays on the unit at 35°.
FIG. 11 is an enlarged, schematic view of a focusing sphere, according to the invention, showing the action of solar radiation at 45°.
Figures 12, 13, 14:
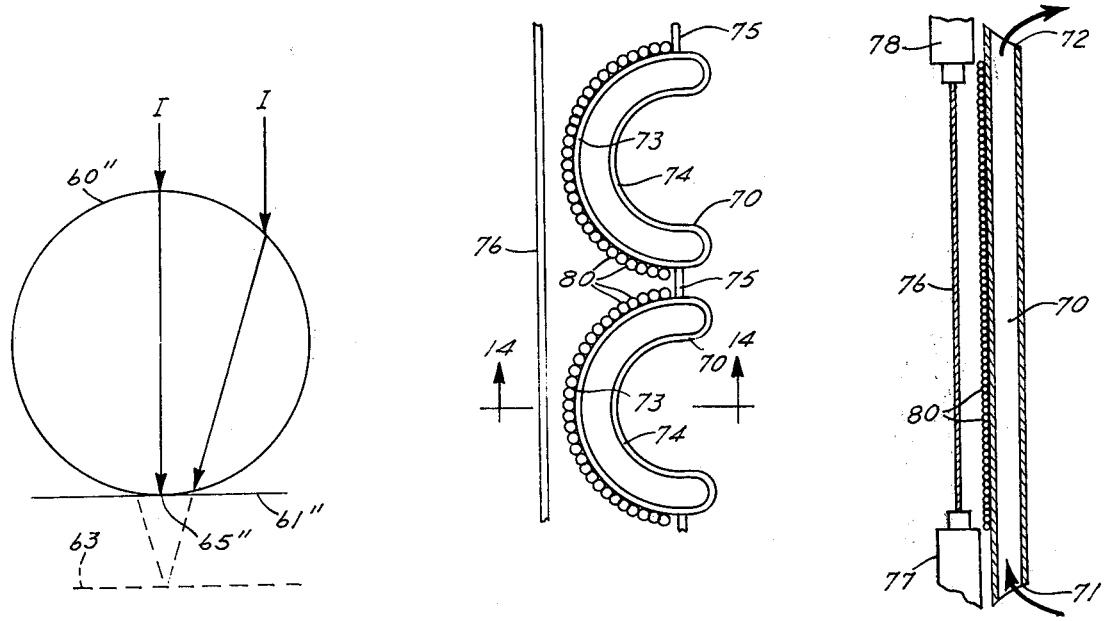
FIG. 12 is an enlarged, schematic view of a spherical focusing element according to the invention, showing the action of solar radiation at 90°.
FIG. 13 is a cross-sectional view of a solar curtain for heating air according to the invention.
FIG. 14 is a side-elevational view of the device of FIG. 3 in reduced size showing the action of the solar absorptive curtain of FIG. 13.

As shown in FIGS. 10, 11, and 12, a sphere transmits radiation into a focus pattern at various incident angles, and provides the focus pattern of the transmitted rays on a black substrate. In the schematic drawing shown in FIG. 10, the sun's radiation is at about a 35° angle to a horizontal absorption plate 61, and these rays impinge upon the exposed portion of the spherical surface of the sphere 60. The sphere 60 is mounted in close proximity to its neighbors i.e. 60a and 60b, for example, so that its whole surface is not exposed. The rays that pass directly through the major diameter of the sphere are not materially deflected and they pass through as generally straight rays. The other rays, however, are bent (refracted) by the material and they form a theoretical focus point 62. When the absorption surface 61 is adjacent the sphere, the point 62 will be below the surface, however, there is a hot circle formed at 65 where the converging rays, that have passed through the sphere, contact the surface 61. At a higher angle, for example, 45° as shown in FIG. 11, the rays passing through the sphere 60' converge and form a hot circle 65', which is spaced from the theoretical focus point 62' below the surface 61'. When the sun is directly overhead or at azimuth, the rays pass through a sphere 60", FIG. 12, forming a hot circle 65" directly overhead or at azimuth, the rays pass through a sphere 60"', FIG. 12, forming a hot circle 65" directly under the sphere on the surface 61". The theoretical focus point is substantially below the surface 61". In any of the cases there is a hot spot formed. Where the absorbing substrate surface is mounted at about the distance of the theoretical focus, for example, on a surface 63 a very much hotter spot is formed. When the substrate is near the theoretical focus point of the rays through a sphere, the spot of focus will be of a considerably higher temperature than the spot where the substrate is adjacent to the sphere. This temperature is determined by the size of the spheres. Where the substrate is metal, heat is readily conducted away from the spot increasing the overall temperature of the metal.

The same focusing effect occurs whether these spheres are relatively large, for example ¼-inch to 2-inch size, as well as the very small micro-spheres which may be adhered directly to the black surface in a one layer arrangement. Where the larger balls are used they may be raised above the surface of the substrate up to about a sixth of the sphere radius without a measurable loss, where the index refraction for the material of the balls is about 1.5 and for the transfer medium about 1.0. The very high temperature circles collectively represent areas of a very high temperature differential with the transfer medium and a greater transfer of heat form the black absorbing substrate to the transfer medium.

Considering the material of the spheres, which may be plastic, such as acrylic, vinyl, polyethylene, polyester, and the like, or glass or the like, there is, also, the transmission of the infrared rays, and an increase of transmission of the infrared as the temperature of the particular material increases. Thus, the supporting structures should be well insulated to retain as much heat as possible, so as to not only heat the black substrate, but, also, the focusing element during the hours of collection to thereby increase the efficiency of the collection system.

The description has been made with the use of solid spherical members, however, hollow spheres, particularly microspheres, have the additional advantage of providing thermal insulation insofar as conduction in their strata. Where the black substrate is near the lower sphere surfaces, the substrate is largely unidirectional in reradiation, and thus there is a two-independent unidirectional heat transfer system with the spheres and the black substrate.

In place of the spheres, parallel optical cylinders will provide effectively a similar optical focusing in bending the light rays passing through the optical cylinders. Further in place of the transparent spheres, such focusing elements as rods, hemispheres, hemisphere-ended rods, tubes, elipses, and other transparent focusing configurations may be used across the absorption area to focus the sun's rays passing through the transparent material onto the black substrate.

As shown in FIGS. 13 and 14, spherical focusing elements can be placed on vertical or horizontal, black, tubular members, which collectively form a curtain for a window. A plurality of arcuate members 70, which are hollow, having an inlet 71 at the bottom and outlet 72 at the top, may be secured together by webs 75 to form a curtain across the window 76. The window is mounted between a lower wall 77 and an upper wall 78. The outer wall 73 of each of the tubular members 70 may be made of a black absorbing material, while the inner wall 74 may be made any color desired. A plurality of spherical members 80 are adhered to the black outer wall 73 in position to accept rays from the sun passing through the window 76. For this type of heating, the curtains must be drawn during the time of sunshine so that sun passing through the window 76 impinges upon the black outer surface. As the solar energy impinges on the black surface through the focusing members 80, the tube 70 is heated and cool air enters the bottom 71, and on being heated, passed out through the top 72 in a natural convention flow. Thus the cold air on the floor of a building will be heated and passed in a circulating flow out the top of the curtain assembly. The focusing spheres, of course, increase the temperature of the sun's rays above the direct impingement temperature, thus a greater temperature difference between the ambient air in the room and the insides of the tubes is achieved to produce a higher rate of circulation and a warmer temperature.

What is claimed is:

1. In a solar radiation collector utilizing a heat absorbing substrate to absorb heat energy from solar radiation which may then be picked up by a fluid heat transfer medium, the improvement of:

a black heat absorbing, planar substrate;

a focusing member including a plurality of essentially touching, transparent spheres as focusing elements disposed and maintained as a monolayer in a single plane on and contacting said black absorbing substrate to induce a variable focusing effect of solar radiation on said black heat absorbing planar substrate to provide a variable increase of the temperature of impinging solar radiation; and means for securing said spheres in said position on said planar substrate, so as to provide a solar radiation pick up with a variable focus area from each of said spheres transmitted to different portions of the substrate at different times of a day, and thereby produce a net increase of temperature of the substrate at a wide range of angles of incidence of solar radiation.

2. The improvement of claim 1 wherein the substrate is a large area and said focusing member includes said spheres formed into a sheet-like assembly.

3. The improvement of claim 2 wherein said spheres are held together in said sheet-like assembly by a web of similar material at about a great circle position on each of said spheres.

4. The improvement of claim 1 wherein said spheres are adhered to said planar substrate by a minimum of surface area in parallel position thereon.

5. The improvement of claim 1 wherein said spheres are in a size range of microspheres up to about 2 inches.

6. The improvement of claim 4 wherein said spheres are microspheres in a size range of 2 to 1000 microns.

* * * * *